(12) United States Patent
Chou et al.

(10) Patent No.: US 8,826,039 B2
(45) Date of Patent: Sep. 2, 2014

(54) APPARATUS AND METHOD FOR PROVIDING HARDWARE SECURITY

(75) Inventors: Paul Chou, Santa Clara, CA (US); Love Kothari, Sunnyvale, CA (US); Lawrence J. Madar, III, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 583 days.

(21) Appl. No.: 12/714,383

(22) Filed: Feb. 26, 2010

(65) Prior Publication Data
US 2011/0191599 A1 Aug. 4, 2011

Related U.S. Application Data

(60) Provisional application No. 61/300,803, filed on Feb. 2, 2010.

(51) Int. Cl.
*G06F 12/14* (2006.01)

(52) U.S. Cl.
CPC .................................... *G06F 12/14* (2013.01)
USPC ............. 713/193; 713/194; 713/189; 726/22; 380/277

(58) Field of Classification Search
USPC .................................. 380/277; 713/193, 194
See application file for complete search history.

(56) References Cited

U.S. PATENT DOCUMENTS

| | | | |
|---|---|---|---|
| 6,577,734 B1 * | 6/2003 | Etzel et al. ..................... 380/277 |
| 7,526,785 B1 * | 4/2009 | Pearson et al. .................. 725/31 |
| 8,160,244 B2 * | 4/2012 | Buer ............................... 380/30 |
| 8,300,831 B2 * | 10/2012 | Kahler et al. .................. 380/286 |
| 8,315,394 B2 * | 11/2012 | Sanvido et al. ................ 380/281 |
| 2002/0129261 A1 * | 9/2002 | Cromer et al. .................. 713/193 |
| 2004/0039925 A1 * | 2/2004 | McMillan et al. ............. 713/189 |
| 2006/0072762 A1 * | 4/2006 | Buer ............................. 380/277 |
| 2006/0090084 A1 * | 4/2006 | Buer ............................. 713/189 |
| 2007/0282756 A1 * | 12/2007 | Dravenstott et al. ............ 705/72 |
| 2008/0022134 A1 * | 1/2008 | Wang ............................. 713/193 |
| 2008/0146270 A1 | 6/2008 | Rofougaran |
| 2010/0008510 A1 * | 1/2010 | Zayas ........................... 380/283 |
| 2011/0154023 A1 * | 6/2011 | Smith et al. .................... 713/155 |

OTHER PUBLICATIONS

U.S. Appl. No. 11/641,999, filed Dec. 19, 2006; titled "Voice/data/RF integrated circuit"; Ahmadreza (Reza) Rofougaran et al.

* cited by examiner

*Primary Examiner* — Mohammad A Siddiqi
(74) *Attorney, Agent, or Firm* — Garlick & Markison; Bruce E. Garlick (57) ABSTRACT

A technique to provide a hardware security module that provides a secure boundary for retention of a secure key within the secure boundary and prevention of unauthorized accesses from external sources outside of the secure boundary to obtain the secure key. The hardware security module includes a security processor to unwrap and authenticate a secure key within the secure boundary to decrypt or encrypt data and to provide data through a single interface that communicates with external sources, so that all data transfers between the secure boundary, formed by the hardware security module, and external sources are transferred only through the interface. The hardware security module ensures no unwrapped key leaves the secure boundary established by the hardware security module.

20 Claims, 3 Drawing Sheets

APPARATUS AND METHOD FOR PROVIDING HARDWARE SECURITY

CROSS REFERENCE TO RELATED APPLICATION

This application claims the benefit of priority to U.S. Provisional Application having an application No. 61/300,803, filed Feb. 2, 2010, and titled "Apparatus and method for providing hardware security" which is incorporated herein by reference in its entirety.

BACKGROUND OF THE INVENTION

1. Technical Field of the Invention

The present invention relates generally to processing devices and, more particularly, to confining a security key or keys for authentication to a boundary established by hardware circuitry, in which traffic in and out of the boundary is only through a designated secure interface.

2. Description of Related Art

Secure key mechanisms are utilized to convey encrypted data, so that only those having the proper key or keys are able to authenticate and decrypt the data. Typically, a sender will encrypt the data that is to be transmitted, in which the data, context data, or content key is "wrapped" to prevent unauthorized access. The recipient of the encrypted data utilizes a content key or a key that is unique to the receiving device to "unwrap" and authenticate to obtain access to the decrypted data. The key may be resident within the recipient or sent by the sender, in which case the key that is sent may also be "wrapped" to protect it from unauthorized access. An authorization key may also be transmitted through a hierarchy of devices and installed in the recipient by traversing a chain of trust through those devices. A variety of techniques are known, such as private key/public key exchanges, for transmitting data securely.

As an example, secure data transfer is utilized to perform secure financial transactions over a network, such as the Internet. In a typical secure transaction, data content that contains financial information, such as a credit/debit card information, are encrypted and transmitted to a designated recipient through an unsecure network. The recipient of the secure data utilizes a secure key to decrypt the data to retrieve the financial information.

In another example, a media content provider may transmit multimedia data, such as audio, video, MP-3 data, music, movies, television shows, etc, to a purchaser of such content utilizing a content key to access the data. The content key allows the authorized recipient to utilize the data. In order to access the content key, the recipient's device needs to "unwrap" the content key, typically using a device unique key, to decrypt the data.

In some instances where a recipient receives encrypted data, it may be possible that the sender allows the authorized recipient to decrypt the data by unwrapping the content key, but does not wish for the recipient to know the value of the key. For example, a provider sending a MP-3 download to a recipient wants the recipient to unwrap the content key to play the MP-3 file, but does not want the content key made available, so that the content key may be shared with other devices or users. Unless the content key is segregated from access by unsecure and/or unauthorized sources, components, circuits and/or software, these resources may have the ability to access and retrieve the secure key. Since, many devices use the same processor to process both secure and unsecure data, it is possible for the unsecure resources to access the secure key through a common component or interchange. In the MP-3 example described above, the content provider wants the downloader to unwrap the content key, but not to have the content key revealed.

Therefore, a need exists to provide a more secure key management scheme where a secure key may be unwrapped by a recipient, but the key not be revealed to the recipient and/or unauthorized resources.

SUMMARY OF THE INVENTION

The present invention is directed to apparatus and methods of operation that are further described in the following Brief Description of the Drawings, the Detailed Description of the Invention, and the Claims. Other features and advantages of the present invention will become apparent from the following detailed description of the embodiments of the invention made with reference to the accompanying drawings.

DETAILED DESCRIPTION OF THE INVENTION

The embodiments of the present invention may be practiced in a variety of settings that utilize a secure key to authenticate and unwrap and/or decrypt data, context data and/or a secure key. The described embodiments below pertain to a particular hardware security module (HSM), but other embodiments may have other name designations. Furthermore, the application of the described embodiment pertains to a mobile phone, but the invention need not be limited to mobile communication or other wireless applications. The invention may be utilized in wired settings, such as wired networks, or other environments having physical conductive connections. The invention is applicable in a setting where secure keys are employed and accesses to the key by unauthorized circuits, components, devices, software, firmware, etc. are to be controlled.

Figure 1:
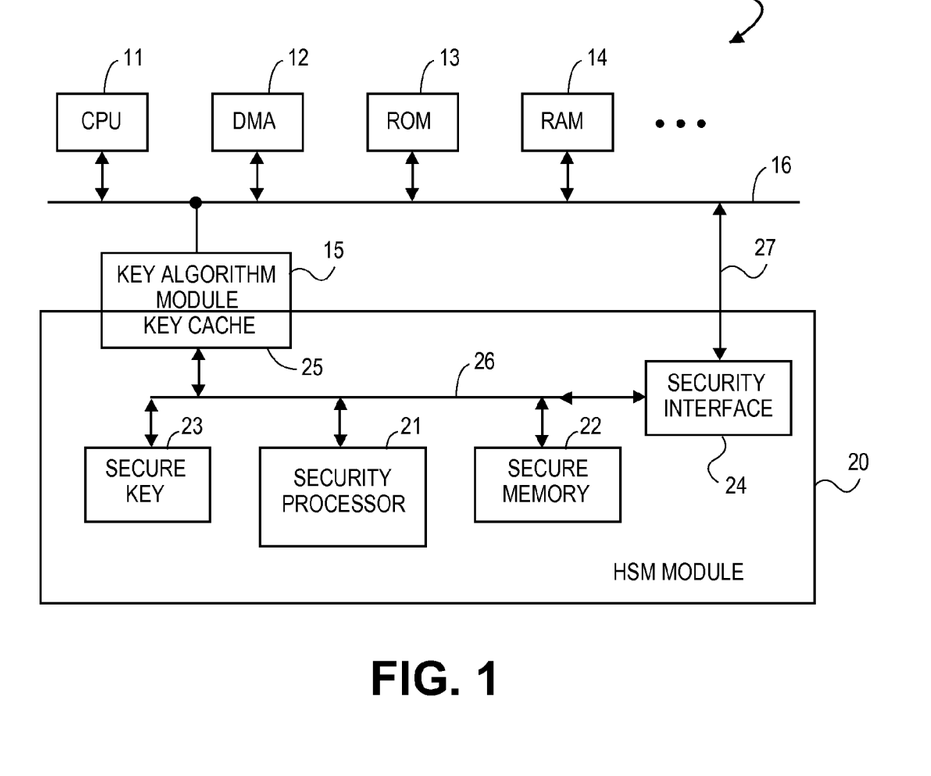
FIG. 1 is a block diagram of one embodiment of a system that implements a hardware security module (HSM) of the present invention to establish a secure boundary for key authentication.

FIG. 1 illustrates a block diagram of a device or system 10 that incorporates a HSM 20 to set a secure domain, zone or boundary to protect a secure key. The term "secure" (such as secure domain, zone or boundary) is used herein to designate a zone controlled by HSM 20. Thus, components outside of the zone established by HSM 20 reside in a non-secure zone relative to HSM 20. The term "key" is used herein to describe any value, data, context, etc., which is used to change the format of the information (such as data) to provide security from unauthorized access. Typically, the information is encrypted and/or decrypted utilizing a key. Without the correct key, it is not possible to readily decrypt encrypted information. The terms encrypt and decrypt are used herein, but other terms may be applicable in describing data that is in secure format.

Aside from HSM 20, device 10 may have a variety of circuits, components and/or devices. FIG. 1 shows one example system 10 in which a number of components are shown. The shown device 10 includes a processor 11 (shown as a central processing unit or CPU), DMA (direct memory access) component 12, ROM (read-only-memory) 13, RAM (random-access-memory) 14, which are all coupled to bus 16. Other components, such as a memory controller, cache memory, bus controller and interfaces, bridges, etc. are not shown, but may be present in other embodiments. The operation and function of components 11-14 are generally known and these components are generally present in many computing devices, including computers, wired and wireless devices, mobile phones, set-top boxes, routers, servers, as well as other devices. As noted in FIG. 1, components 11-14 reside outside of a boundary established by HSM 20 and, therefore, are regarded as residing in a non-secure domain or zone. In one embodiment, HSM 20 is constructed on a single integrated circuit chip. In another embodiment, device 10, including HSM 20, is constructed on a single integrated circuit chip.

HSM 20 includes a security processor 21, secure memory 22, secure key module 23, secure bus 26 and a security interface 24. The various components 21-24 and 26 reside within a secure boundary established by the hardware. That is, a secure domain or zone is established by and for the components within HSM 20, in order to set a secure boundary for processing that occurs within this boundary. Security processor 21 provides the various processing within HSM 20, including key authentication and the encrypting and/or decrypting operation to encrypt and/or decrypt data. Secure key module 23 is a storage medium, such as a memory, register, circuit, etc. that stores one or more key value(s) that is used by security processor 21 to encrypt and decrypt data. Secure memory 22 is utilized to store data that is processed and/or to be processed by security processor 21.

For HSM 20, all data transfers between the secure domain and non-secure (unsecure) domain is routed through security interface 24. As shown, a connection or bus 27 couples security interface 24 to bus 16, so that all accesses to HSM 20 and data transfers into and out of HSM 20 are routed through security interface 24. No other accesses are permitted from the non-secure domain to HSM 20, except for the key cache operation described later in the description.

In operation, when encrypted data is received by device 10, components within the non-secure domain, such as CPU 11, process the data and transfers the encrypted data to security interface 24. Security interface 24 is utilized as the single interface for data transfers between components of HSM 20 and devices that reside outside of HSM 20. Security interface 24 may have its own processing capability or may operate under control of security processor 21. The received encrypted data is then typically coupled to secure memory 22 for storage or coupled to security processor 21 for processing. In order to process the encrypted data, a content key may be associated with the data. That is, a wrapped content key may be sent with the data and this wrapped content key, when unwrapped, is utilized to decrypt the data content. Security processor 21 may use a device unique key that is unique to the device to unwrap the content key. The unwrapped content key is then utilized to decrypt the data. In some instances, a content key may not be present, in which case the device unique key may be used to decrypt the data. The decrypted data may be stored first in secure memory 22, but eventually provided to security interface 24 so that the decrypted data may be output to the non-secure domain for further processing. Alternatively, a key algorithm module may be used for decryption, as described later in the description.

As a further example, security processor 21 may further provide secure operations on the decrypted data or, alternatively, provide secure operations on data obtained from the non-secure domain. In these instances, security processor 21 allows confidential context data to be wrapped using one of the secure keys stored in secure key module 23 and the wrapped context data securely stored in a storage component in the non-secure domain. The operating context data may be a key or it may be data itself. Since the context data is wrapped within HSM 20 prior to the context data leaving HSM, the context data is protected from any unauthorized access from devices resident in the non-secure domain. That is, the key is never exposed outside of the secure boundary established by HSM 20.

It is to be noted that since the unwrapping of secure keys is done solely within HSM and since the only route to internal hardware components of HSM 20 is through security interface 24, any unauthorized attempts from the non-secure domain to access an unwrapped key is prevented. In this manner, a content provider may provide encrypted content with a content key to system 10 and the unwrapping of the content key is performed strictly within HSM 20, such as by using the device unique key stored in secure key module 23. Once the content data is decrypted, the content may be provided to components within the non-secure domain, again through the security interface. HSM 20 ensures that a secure key is unwrapped only within HSM 20 and that secure keys and/or secure context data that leave HSM 20 are always in a wrapped protected state. Preventing unauthorized access to secure keys, such as content keys, ensures that the secure key is always protected in the unwrapped state within the secure zone and not accessed or copied by unauthorized entities from outside of the secure zone. Anytime a secure key or content data leaves the secure zone of HSM 20, the key or content is in a wrapped state.

In some embodiments, a key algorithm module 15 may be present, as shown in the example device 10 of FIG. 1. Key algorithm module 15 resides in the non-secure domain and contains one or more algorithms to encrypt/decrypt data. The algorithms, which are typically software routines for providing encryption/decryption, may be resident within key algorithm module 15 or loaded into key algorithm module 15. However, in order to perform the encryption/decryption, a secure key is needed. In order to ensure that an unwrapped key is not accessible by components in the non-secure domain, key algorithm module 15 includes a key cache 25, which resides within the secure domain. When an operating algorithm within key algorithm module 15 requires a secure key, security processor 21 unwraps the secure key and places the unwrapped key contents in key cache 25 for use by an algorithm in key algorithm module 15. Although the content of key cache 25 may be utilized, the content of cache 25 may not be copied or otherwise accessed by components of the non-secure domain. Once the key is no longer needed by key algorithm module 15, the cache content of key cache 25 is invalidated, evicted or erased to prevent unauthorized access.

Accordingly, HSM 20 ensures that any secure key and/or secure context data that is unwrapped remains within HSM 20 and, further, any unauthorized access or copying from outside of HSM 20 is prevented. Whenever the secure key and/or context data is to leave the secure zone of HSM 20, HSM 20 ensures that the key and/or context data is in a wrapped state.

Figure 2:
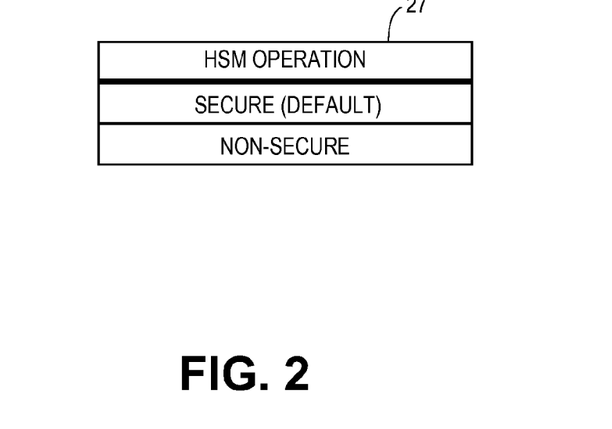
FIG. 2 is illustrates an embodiment of the HSM in which the HSM has two operational modes.

It is to be noted that for one embodiment, HSM 20 is operable to function in two different modes. FIG. 2 shows a table 27 that illustrates the two modes available for HSM 20. In the first mode, HSM 20 operates as described above in providing a secure boundary or firewall in retaining secure key(s) and/or context data. The second mode of operation is a non-secure mode of operation for HSM 20. A non-secure mode may be desired where device 10 is to operate utilizing a prior art technique for unwrapping a key (or context data). Thus, the non-secure mode operates as a non-firewall mode, in which non-secure components (such as CPU 11) are allowed access into HSM 20. In some instances, the non-firewall mode is referred to as "legacy" mode, indicating a prior art condition where a secure firewall is not present to prevent the non-secure access.

The ability to select between secure mode of operation and non-secure mode of operation for HSM 20, allows a device manufacture or OEM (Original Equipment Manufacturer) to use an integrated circuit that includes HSM 20 in one or more devices and then select which mode to implement in the particular device. Alternatively, the device may be configured during use to select between the two modes. For example, a non-secure mode of operation may be selected while performing troubleshooting or repair procedures. However, this selection may not be available to the user of the device, since allowing the user to select the non-secure mode of operation will most likely defeat a purpose of having such secure mode of operation. It is to be noted that in other embodiments, the selection feature to operate HSM 20 in the non-secure mode may not be available.

Figure 3:
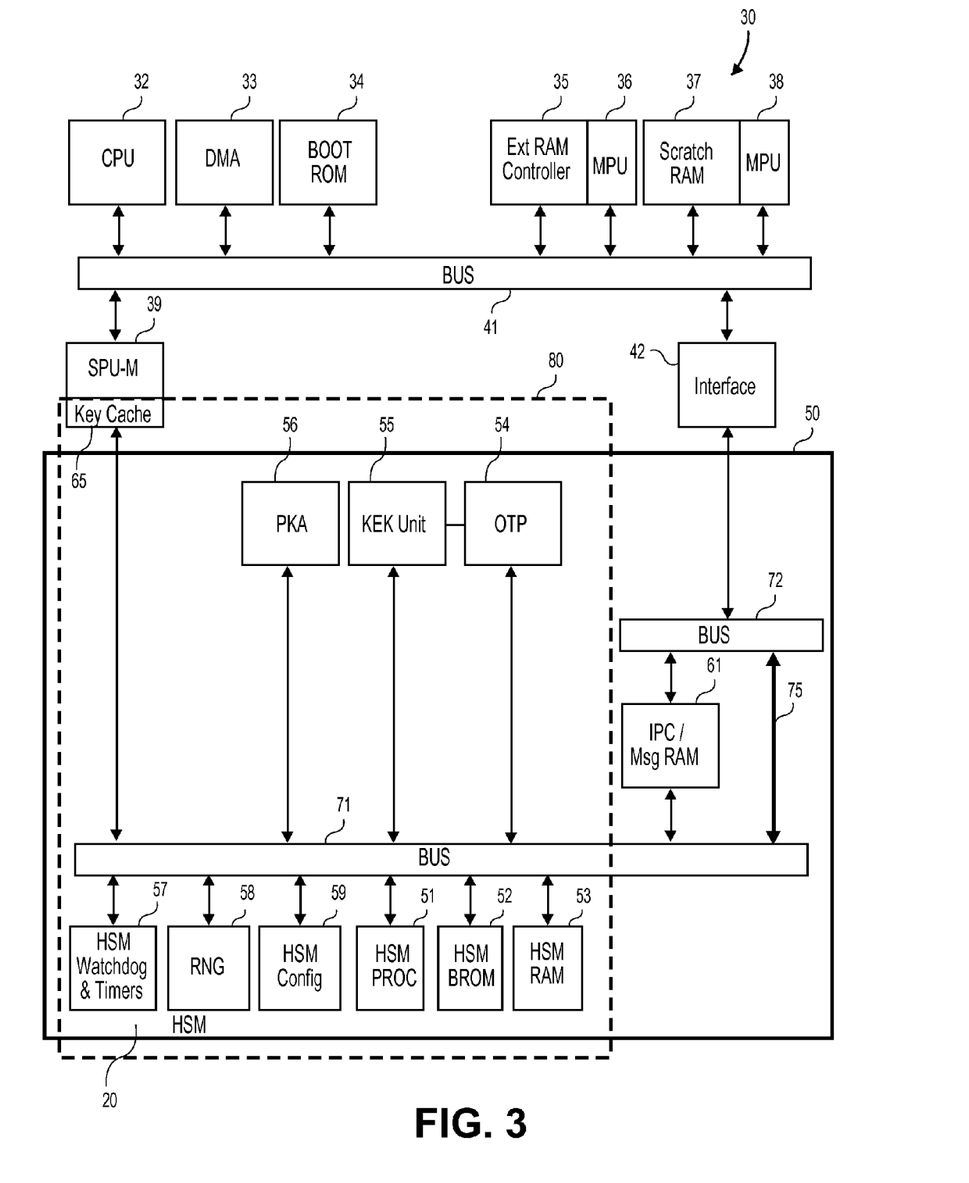
FIG. 3 is a block diagram of another embodiment that utilizes a more detailed HSM than the HSM of FIG. 1.

FIG. 3 is an embodiment of a device or system 30 that utilizes a more detailed HSM than the HSM of FIG. 1. The various components in the non-secure domain or zone are shown coupled to a bus 41. In the particular embodiment of device 30, the shown components in the non-secure domain include a processor 32 (labeled as CPU), DMA 33, Boot ROM (BROM) 34, external RAM controller 35 for controlling accesses to an external RAM, with accompanying MPU (memory partition unit) 36, and scratch RAM 37, with accompanying MPU 38.

Processor 32 is equivalent to CPU 11 of FIG. 1 in that processor 32 provides central processing for device 30. In one embodiment, processor 32 is operable to use several processor security levels of operation, including a supervisor mode and a user mode. However, these processor security levels of operation are separate from the secure zone operation of HSM 20 and whether one or more processor security levels are present (or not present) do not affect the described operation of HSM 20.

DMA 33 is a DMA that is operable to provide direct memory access to internal memory and/or external memory. In one embodiment, external RAM controller 35 provides memory control of external RAM of device 30, while an internal scratch RAM 37 is provided on chip. BROM 34 is utilized when processor 32 is initialized at boot-up or reset to boot the device. In some embodiments, there may be more than one such BROM 34.

It is to be noted again that the components coupled to bus 41 may vary from embodiment to embodiment and that the particular components shown are for exemplary purpose only and do not limit the type of components that may be used. Furthermore, although a single bus 41 is shown, other embodiments may use multiple or nested buses with bridge or interface units disposed between the buses. In one embodiment, bus 41 is an AXI (Advanced eXtensible Interface) bus, but other embodiments may use another type of bus.

HSM 20 in this embodiment includes a number of hardware and software components that encompass a secure domain boundary as shown in FIG. 3. A solid-lined box 50 represents the boundary formed by the actual hardware components of HSM 20, while dashed-line box 80 represents the actual secure domain boundary that is not accessible by non-secure components. HSM 20 of FIG. 3 includes a HSM processor 51, HSM Boot ROM 52, HSM RAM 53, HSM watchdog and timers module 57, RNG (random number generator) 58, HSM configuration module 59, PKA (Public Key Accelerator) module 56, OTP (One Time Programmed memory) 54, KEK (Key-Encryption Key) unit 55, and IPC/Msg RAM (Inter Processor Communication/Message RAM) module 61. Two different buses 71 and 72 are also present within HSM 20.

The main processing operations for HSM 20 are provided by HSM processor 51, which operates with its BROM 52 and RAM 53. Processor 51 sets various security functions for HSM 20 and may also control IPC/Msg RAM module 61. HSM RAM 53 may be a scratch RAM in one embodiment, but other types of RAM or memory may be used. Processor 51, BROM 52 and RAM 53 are coupled to bus 71. Bus 71 may be an AHB (Advanced High performance Bus), an APB (Advanced Peripheral Bus), or some other bus. Other units 54-69 are also coupled to bus 71. It is to be noted that other embodiments may have more than one bus for coupling components 51-59. IPC/Msg RAM module 61 is also coupled to bus 71, as well as to bus 72. In one embodiment, bus 72 is an AHB bus. IPC/Msg RAM module 61 operates as an interface/bridge between bus 71 and bus 72, as well as the only access pathway to exchange data between HSM 20 and the non-secure domain. Bus 72 is coupled to bus 41 via interface or bridge 42.

For HSM 20 of FIG. 3, IPC/Msg RAM module 61 and bus 72 reside within the hardware boundary 50, but shown residing outside of secure zone 80, since IPC/Msg RAM module 61 is accessible by non-secure components outside of HSM 20 boundary. That is, all accesses in and out of HSM 20 are routed via IPC/Msg RAM module 61 when in the secure mode of operation, in order to control accesses to HSM 20 by non-secure components that reside outside of HSM 20. Thus, similar to security interface 24 of FIG. 1, IPC/Msg RAM module 61 controls the ingress and egress of instructions and/or data between components within HSM 20 and components outside of HSM 20.

Aside from processor 51, BROM 52 and RAM 53, the other components of HSM 20 that reside within secure zone 80 are components 54-60. As noted, in some embodiments, multiple buses may be used for coupling components 51-59. Other embodiments for implementing HSM 20 may have more or less components than that shown in FIG. 3. In the particular embodiment shown, components 51-53 provide general operation of HSM 20 in respect to processing instructions and or data that transitions across the secure boundary 80 via IPC/Msg RAM module 61. Components 54-59 are operable to provide processing operations that pertain to secure key functions, including the wrapping and unwrapping of keys, context data, etc.

In respect to secure key processing, HSM configuration module 59 establishes the operating configuration for the processors and/or accelerators that are used to wrap/unwrap and authenticate keys. HSM watchdog and timers module 57 provides the necessary clocks and timers that are utilized for key processing, as well as monitoring of key processing. OTP 54 is a non-volatile memory that is used to one-time program a key value or values for device 30. For example, the device unique key may be programmed and stored in OTP 54.

KEK unit or module 55 is used to provide processing for key management in wrapping and unwrapping key(s) stored in OTP 54. In the shown embodiment, a direct link exists between KEK unit 55 and OTP 54, so that the key stored in OTP 54 may be loaded into KEK unit 55 without transitioning onto bus 71. The direct link between KEK unit 55 and OTP 54 provides additional security, since the key transfer between components 54 and 55 utilizes a dedicated hardwired connection.

Other than unwrapping and authenticating keys, KEK unit 55 allows confidential operating context data to be wrapped and, subsequently, stored securely in a storage component outside of secure zone 80. KEK unit 55 provides an ability to wrap/unwrap keys using AES key wrap specification and has an ability to load the root key directly from OTP 54 without interaction from the processor, thus protecting the key from any potential software attacks.

In one embodiment, the operating context data is protected by a Secure Storage Key (SSK), a KEK wrap key or an application key that is distributed securely to HSM 20, such as an authorization key installed by traversing a chain of trust to device 30. The SSK may be of any type of key and in one embodiment, SSK that is used for HSM 20 is a 256-bit AES-CCM (Advance Encryption Standard-Counter with CBC-MAC) key that is generated by RNG 58 and stored in OTP 54. The SSK never leaves HSM 20 and is used to wrap the operating context.

RNG 58 uses a random bit generator to generate true random numbers. In one embodiment, RNG 58 utilizes free running oscillators to capture thermal noise as the source of randomness and is controlled via configuration registers and generates one bit at a time into a 512 bit capture FIFO (First-In-First-Out). The generated random value is typically used as a seed for a cryptographic algorithm and the value from RNG 58 is typically post processed and not used directly. In one embodiment, the random bit rate is a nominal 1 MHz generation rate providing 1 Mbps of random data.

PKA module 56 is a specialized processor that provides acceleration for a number of algorithms. In one embodiment, PKA module 56 is an accelerator that is operable for the following algorithms:
1. Diffie-Hellman public value and shared key computation of modulus sizes up to 4096 bits.
2. 1024-bit DSA signature with SHA-1 hash or 2048-bit DSA signature with SHA-256 hash.
3. RSA encryption of modulus sizes up to 4096-bit key size.
4. RSA decryption of modulus sizes up to 4096-bits using Chinese Remainder Theorem.
5. RSA key generation with Rabin-Miller number selection.
6. Elliptic curve Diffie-Hellman in prime field GF(p).
7. Prime field EC-DSA signature for modulus sizes up to 512-bit.
8. Generic prime field ECC point operations.
9. Generic long integer math operations.
10. NIST prime field ECC curve optimization.

It is to be noted that these algorithms are listed for exemplary purpose and that other embodiments of PKA module 56 may support a different list of algorithms, including algorithms not listed above.

Furthermore, similar to cache 25 of FIG. 1, HSM 20 also provides a connection to a key cache 65 of a Secure Processing Unit for Mobile processors (SPU-M) module 39, which is equivalent to key algorithm module of 15 of FIG. 1. In the particular embodiment shown, SPU-M module 39 operates as a hardware accelerator for symmetric key algorithms. In other embodiments there may be multiple such SPU-M units, with respective caches. In one embodiment, key cache 65 has capacity to store 512 bytes and cache 65 is organized with a small table to describe the key type, the starting location and the size of each key entry. The table is physically stored in the same memory as the key entries. As shown, HSM software may access the entire key cache memory from bus 71. The algorithm(s) of SPU-M module 39 may access key cache 65, which contains the unwrapped keys, but the contents of key cache 65 are not retrievable by software running on non-secure components outside of secure domain 80. For security protection, reading from the key cache may be disabled in certain specified situations.

In one embodiment, SPU-M module 39 may implement many symmetric key algorithms such as AES, DES, RC4, SHA1-HMAC, SHA2-HMAC, MD5-HMAC, as well as others. It is to be noted that these algorithms are listed for exemplary purpose and that other embodiments of SPU-M module 39 may support a different list of algorithms, including algorithms not listed above. Keys for these algorithms may be loaded by HSM 20 into key cache 65. Components outside of the HSM secure zone, such as CPU 32, may then send encrypted/decrypted data along with a pointer to a corresponding key entry in key cache 65. SPU-M module 39 receives the payload and accesses the correct key from key cache 65 and perform decryption/encryption operations.

In another embodiment, SPU-M module 39 may also support a DMA operation for sending large amounts of data in and out of the module to process application data. An external DMA engine, such as DMA 33, operates in non-secure mode to facilitate bulk cryptographic processing through SPU-M module 39. The cryptographic processing capability of SPU-M module 39 may include:
1. Cross-connected encryption and hash engines to support single pass AUTH-ENC or ENC-AUTH processing.
2. Scalable AES module to support CBC, ECB, CTR, CFB, OFB, XTS encryption with 128-bit, 192-bit and 256-bit AES key sizes.
3. Scalable DES module to support DES and 3DES in ECB and CBC modes.
4. RC4 stream cipher module to support state initialization, state update and key stream generation.
5. MD5/SHA1/SHA224/SHA256 combo engine to support pure hash or HMAC operations.

These are just some features and other embodiments may utilize other cryptographic processing capabilities.

Furthermore, SPU-M module 39 may provide extremely high degree of scalability. Scalability of SPU-M module 39 is achieved through the seamless replacement of cryptographic cores of different performance factors. Specifically, various algorithm engines may be scaled to enhance certain features (such as providing more hash algorithms) when needed or reduce features when not needed.

HSM 20 configures and enables IPC/Msg RAM module 61 so that all accesses and transfers to and from HSM 20 to/from components outside of HSM 20 are routed through IPC/Msg RAM module 61. In this way, access to retrieve and/or copy unwrapped secure keys in HSM 20 are prevented and secure keys never leave HSM 20 in an unwrapped state. When operating in the non-secure mode (such as the non-firewall mode), HSM 20 disables IPC/Msg RAM module 61 from maintaining a secure interface between buses 71 and 72. Instead, a direct feedthrough connection (as illustrated by connection 75) is established between buses 71 and 72 to allow non-secure access to HSM 20 and processor 51 is not enabled to perform HSM secure functions.

As noted previously, the use of a non-firewall mode allows a same integrated circuit (IC) chip to be two different devices. One where HSM firewall is used and another where HSM firewall is disabled. Connection 75 is disabled when secure operation of HSM is desired. In one embodiment, disabling of connection 75 is achieved by programming a non-volatile bit in OTP 54 during manufacturing. A non-secure mode may be utilized during initial testing and productization. In the non-secure mode, unwrapped key(s) may be accessed by components outside of HSM 20.

Figure 4:
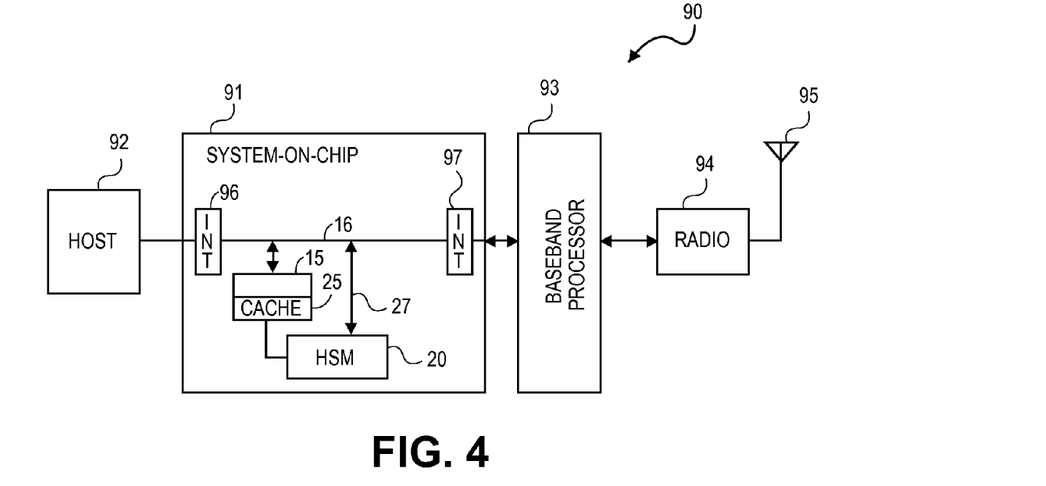
FIG. 4 is a block diagram of a system that incorporates the HSM of FIG. 1 or 3 in a device that includes a radio portion for wireless communication.

HSM 20 may be implemented in a variety of components, circuits, devices, processors, state machines, programmable arrays, etc. It is to be noted that HSM 20 may be constructed on a single integrated circuit (IC) chip or on multiple chips. In other embodiments, components of device 30 is implemented within a single integrated circuit (IC) chip 91 that incorporates a complete system on the IC chip (System-On-Chip or SOC). FIG. 4 shows one such embodiment in which HSM 20 and other components of FIG. 1 or 3 are implemented as SOC 91. It is to be noted that device 30 of FIG. 3 may be readily implemented as SOC 91.

The particular implementation of SOC 91 in FIG. 4 is a wireless device 90 that is used to transmit and receive wireless communication. For wireless communication, a baseband processor (or baseband processing module) is present to provide baseband processing and a radio component is typically present to provide the baseband to radio frequency (RF), and vice versa, conversion. The radio also includes a transmitter and receiver (transceiver) to transmit and receive RF signals. Accordingly, wireless device 90 includes a baseband processor 93 and radio 94. Radio 94 is coupled to an antenna 95, or a plurality of antennas for multiple antenna transmissions and/or receptions. A variety of baseband processing devices and radio devices, including known devices, may be respectively implemented for baseband processor 93 and radio 94. In some embodiments, baseband processor 93 may be part of IC 91. In other embodiments, both baseband processor 93 and radio 94 may be part of IC 91.

Furthermore, a host component or device 92 may be present and coupled to operate with IC 91. A variety of host components, such as displays, keypads, touch pads, speakers, head phones, microphones and other user interfaces may encompass host 92. In some embodiments, part of or all of host 92 may be included within IC 91.

Figure 5:
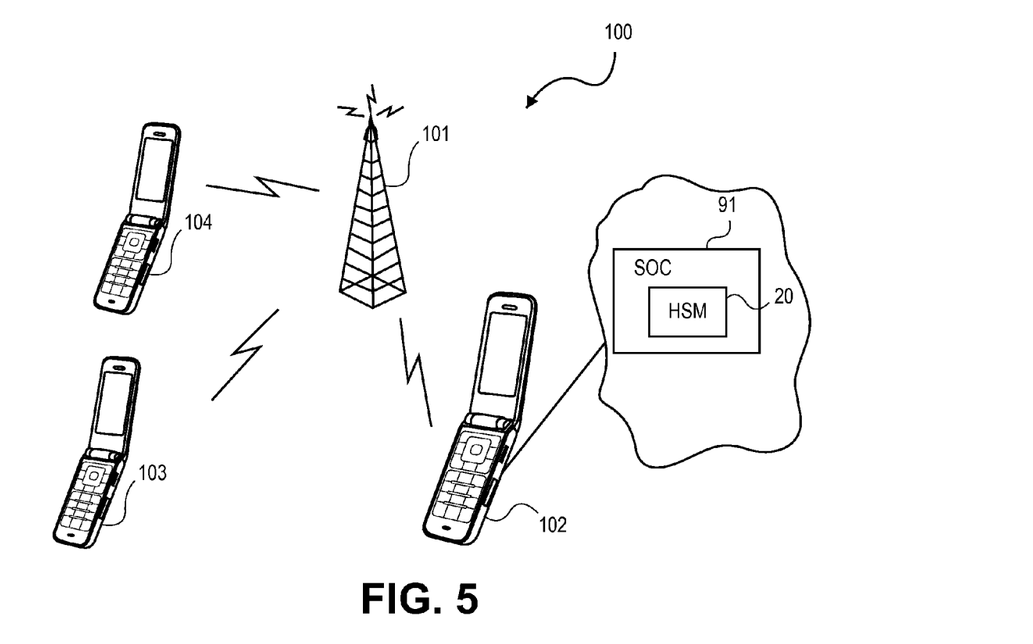
FIG. 5 is an example that illustrates the use of the device of FIG. 4 in a mobile phone.

FIG. 5 shows one example application for device 90. As shown in FIG. 5, device 90 is implemented in a mobile phone 102, such as a cell phone. The particular mobile phone operates within a cellular network 100 that includes a base station 101 and other mobile phones, of which two other mobile phones 103, 104 are shown. The various functional blocks of HSM 20, as well as the non-secure components as described above allow HSM 20 to operate within a mobile phone in one embodiment for practicing the invention. However, the invention need not be limited to mobile phones and the invention may be practiced in other devices as well.

Accordingly, a technique for providing secure key operation, in which a secure zone boundary is defined by components that make up a hardware security module (HSM) is described. Secure keys are wrapped/unwrapped and authenticated within the secure zone and do not leave the HSM in an unwrapped state, nor are the unwrapped keys accessed or copied by unauthorized source external to the secure boundary established by the HSM.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

We claim:

1. An apparatus constructed on an integrated circuit comprising:

a hardware security module that is configured to provide a secure boundary for retention of a device unique key for an integrated circuit and to prevent unauthorized accesses from external sources outside of the secure boundary to obtain the device unique key, the hardware security module including an interface for data transfers between the secure boundary of the hardware security module and external sources external to the secure boundary, the hardware security module including a security processor to utilize the device unique key to unwrap a content key within the secure boundary and to decrypt, within the secure boundary, encrypted data received from one of the external sources via the interface by using the unwrapped content key, the security processor to provide decrypted data to the interface for transfer of the decrypted data out of the secure boundary, wherein the data transfers between the secure boundary and the external sources are transferred only through the interface, the hardware security module further including a key cache that is secure from being copied by the external sources to cache the unwrapped content key, in which the unwrapped content key in the key cache is available for use by a routine operating external to the secure boundary to perform encryption or decryption, but without an ability for the routine to copy the unwrapped content key in the key cache; and a bus coupled to the interface of the hardware security module and residing external to the secure boundary to transfer data between the interface and the external sources.

2. The apparatus of claim 1, wherein the hardware security module further includes a secure key storage to store the device unique key, in which the device unique key is accessible only by the security processor and not by software operating outside of the secure boundary.

3. The apparatus of claim 2, further including an algorithm module configured with the key cache, but operating external to the secure boundary, to execute the routine that uses the unwrapped content key in the key cache.

4. The apparatus of claim 2, wherein the security processor of the hardware security module is configured to wrap context data received via the interface using the device unique key and to transfer the wrapped context data via the interface to one of the external sources.

5. The apparatus of claim 2, wherein the hardware security module includes a secure mode of operation and a legacy mode of operation, in which when in the legacy mode of operation, the security processor is disabled from performing security functions to maintain the secure boundary.

6. An integrated circuit comprising:
  a security processor that operates within a secure boundary for retention of a device unique key within the secure boundary and to prevent unauthorized accesses from external sources outside of the secure boundary to obtain the device unique key, the security processor coupled to a first bus;
  an interface coupled to the security processor via the first bus and also coupled to a second bus that communicates with the external sources external to the secure boundary, in which data transfers between the secure boundary and the external sources are transferred only through the interface;
  a secure key storage coupled to the first bus to store the device unique key, in which the device unique key is not accessible by software operating external to the secure boundary;
  a key unit coupled to the first bus and the secure key storage to obtain the device unique key and use the device unique key to unwrap a content key within the secure boundary to decrypt, within the secure boundary, encrypted data received from one of the external sources via the interface by using the unwrapped content key and to provide decrypted data to the interface for transfer of the decrypted data out of the secure boundary under control of the security processor; and
  a cache memory coupled to the first bus that is secure from being copied by the external sources to cache the unwrapped content key, in which the unwrapped content key in the cache memory is available for use by an algorithm routine operating external to the secure boundary to perform encryption or decryption, but without an ability for the algorithm routine to copy the unwrapped content key in the cache memory.

7. The integrated circuit of claim 6, wherein the cache memory operates with a key algorithm module that resides outside of the secure boundary to execute the algorithm routine that uses the unwrapped content key in the cache memory, but in which the unwrapped key in the cache memory is prevented from being copied by the algorithm routine.

8. The integrated circuit of claim 6, wherein the key unit is configured to wrap context data received via the interface by using the device unique key and to transfer the wrapped context data via the interface to one of the external sources.

9. The integrated circuit of claim 6, wherein the security processor operates in a secure mode of operation or a legacy mode of operation, in which when in the legacy mode of operation, the security processor is not enabled to perform security functions to maintain the secure boundary.

10. The integrated circuit of claim 6, further including a Public Key Accelerator coupled to the first bus to provide accelerated processing for public key algorithms.

11. The integrated circuit of claim 6, further comprising a random number generator coupled to the first bus to generate a random number seed for generation of another key.

12. The integrated circuit of claim 6, wherein the key unit is directly hardwired coupled to the secure key storage for transfer of the device unique key between the key unit and the secure key storage.

13. The integrated circuit of claim 6, wherein the security processor, key unit, interface and secure key storage are implemented as part of a mobile phone.

14. An apparatus constructed on an integrated circuit comprising:
  a hardware security module, constructed on an integrated circuit, that is configured to provide a secure boundary for retention of a device unique key within the secure boundary and to prevent unauthorized accesses from external sources outside of the secure boundary to obtain the device unique key, the hardware security module including an interface for data transfers between the secure boundary of the hardware security module and external sources external to the secure boundary, the hardware security module including a security processor to utilize the device unique key to unwrap a content key within the secure boundary and to decrypt, within the secure boundary, when encrypted data is received from one of the external sources via the interface by using the unwrapped content key, the security processor to provide decrypted data to the interface for transfer of the decrypted data out of the secure boundary, wherein the data transfers between the secure boundary and the external sources are transferred only through the interface;
  an algorithm module coupled to one or more of the external sources and residing external to the secure boundary, wherein the algorithm module executes an algorithm for encryption or decryption using the unwrapped content key, when data is not sent to the hardware security module via the interface for operation by the security processor; and
  a secure key cache that resides within the secure boundary to cache the unwrapped content key, wherein the secure key cache operates with the algorithm module to allow the unwrapped content key to be used by the algorithm, but without an ability for the algorithm to copy the unwrapped content key in the secure key cache and not made accessible to the external sources.

15. The apparatus of claim 14, wherein a data transfer performed by one of the external sources when utilizing the algorithm module utilizes a direct memory access transfer to transfer the data to the algorithm module.

16. A method comprising:
  receiving encrypted data at an interface within a hardware security module, constructed on an integrated circuit, that that is configured to provide a secure boundary for retention of a device unique key within the secure boundary and to prevent unauthorized accesses from external sources outside of the secure boundary to obtain the device unique key, the encrypted data being coupled through the interface that transfers data between the secure boundary and the external sources;
  accessing the device unique key by a security processor within the hardware security module;
  unwrapping a content key by the security processor by using the device unique key;
  operating on the encrypted data utilizing the unwrapped content key to decrypt the data;
  transferring decrypted data via the interface for transfer out of the secure boundary of the integrated circuit, in which data transfers between the secure boundary and external sources are transferred only through the interface and in which the unwrapped content key is not exposed to the external sources;

caching the unwrapped content key in a key cache residing within the secure boundary, in which the key cache is secure from being copied by the external sources; and utilizing the unwrapped content key in the key cache by an algorithm residing external to the secure boundary to encrypt or decrypt, but being prevented for the algorithm to copy the unwrapped content key in the key cache.

17. The method of claim 16, further including storing the device unique key in a secure key storage within the hardware security module, in which the device unique key is accessible only by the security processor and not by software operating with the external sources.

18. The method of claim 16, further including executing the algorithm in an algorithm module residing external to the secure boundary.

19. The method of claim 16, further including wrapping context data received by the interface by using the device unique key by the security processor and transferring the wrapped context data via the interface to one of the external sources.

20. The method of claim 16, further including operating the hardware security module in a legacy mode of operation, in which when in the legacy mode of operation, the security processor is not enabled to perform security functions to maintain the secure boundary.

\* \* \* \* \*

UNITED STATES PATENT AND TRADEMARK OFFICE
CERTIFICATE OF CORRECTION

PATENT NO. : 8,826,039 B2  
APPLICATION NO. : 12/714383  
DATED : September 2, 2014  
INVENTOR(S) : Chou et al.

Page 1 of 1

It is certified that error appears in the above-identified patent and that said Letters Patent is hereby corrected as shown below:

Col. 12, line 52, in claim 16: after "that" delete "that"

Signed and Sealed this  
Twenty-third Day of February, 2016

Michelle K. Lee  
*Director of the United States Patent and Trademark Office*